US010334586B2

(12) United States Patent
Gulati et al.

(10) Patent No.: US 10,334,586 B2
(45) Date of Patent: Jun. 25, 2019

(54) HYBRID AUTOMATIC REPEAT REQUEST FEEDBACK FOR UNICAST SIDELINK COMMUNICATIONS

(71) Applicant: QUALCOMM Incorporated, San Diego, CA (US)

(72) Inventors: Kapil Gulati, Franklin Park, NJ (US); Sudhir Kumar Baghel, Bridgewater, NJ (US); Shailesh Patil, Raritan, NJ (US); Hua Chen, Berkeley Heights, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

(21) Appl. No.: 15/399,157

(22) Filed: Jan. 5, 2017

(65) Prior Publication Data
US 2017/0215183 A1 Jul. 27, 2017

Related U.S. Application Data

(60) Provisional application No. 62/281,834, filed on Jan. 22, 2016.

(51) Int. Cl.
*H04W 72/04* (2009.01)
*H04L 1/18* (2006.01)
*H04W 92/18* (2009.01)

(52) U.S. Cl.
CPC ....... *H04W 72/0426* (2013.01); *H04L 1/1812* (2013.01); *H04L 1/1887* (2013.01);
(Continued)

(58) Field of Classification Search
CPC ......... H04W 72/0426; H04W 72/0446; H04W 92/18; H04L 1/1812
See application file for complete search history.

(56) References Cited

U.S. PATENT DOCUMENTS

2015/0180616 A1 6/2015 Lee et al.
2017/0041941 A1* 2/2017 Chen ..................... H04W 72/02

FOREIGN PATENT DOCUMENTS

WO 2015139286 A1 9/2015

OTHER PUBLICATIONS

ETRI: "Procedure for Mode 1 D2D Communication", 3GPP Draft, R2-141473, 3rd Generation Partnership Project (3GPP), Mobile Competence Centre, 650, Route Des Lucioles, F-06921 Sophia-Antipolis Cedex, France, vol. RAN WG2, no. Valencia, Spain, Mar. 31, 2014-Apr. 4, 2014, Mar. 22, 2014 (Mar. 22, 2014), XP050817854, Retrieved from the Internet: URL: http://www.3gpp.org/ftp/tsg_ran/WG2_RL2/TSGR2_85bis/Docs/ [retrieved on Mar. 22, 2014].

(Continued)

*Primary Examiner* — Jackie Zuniga Abad
(74) *Attorney, Agent, or Firm* — Arent Fox, LLP; Clint R. Morin

(57) ABSTRACT

One problem with current D2D communications is that there is no physical layer feedback (e.g., HARQ feedback) for unicast sidelink communications. That is, the transmitting UE does not know if the receiving UE receives and/or properly decodes the unicast transmission. Instead, current D2D communications require that a transmitting UE send a unicast sidelink communication multiple times to increase the chances that the unicast sidelink communication is received by the receiving UE. By blindly transmitting unicast sidelink communications multiple times, the spectral efficiency and radio resource utilization of the network is decreased. The present disclosure provides a solution to this problem by enabling HARQ feedback for unicast sidelink communications that improves the spectral efficiency and also enables better radio resource utilization for the network.

30 Claims, 15 Drawing Sheets

(52) U.S. Cl.
CPC ....... *H04L 1/1896* (2013.01); *H04W 72/0446* (2013.01); *H04W 92/18* (2013.01)

(56) References Cited

OTHER PUBLICATIONS

International Search Report and Written Opinion—PCT/US2017/012524—ISA/EPO—Apr. 21, 2017.

\* cited by examiner

HYBRID AUTOMATIC REPEAT REQUEST FEEDBACK FOR UNICAST SIDELINK COMMUNICATIONS

CROSS-REFERENCE TO RELATED APPLICATION(S)

This application claims the benefit of U.S. Provisional Application Ser. No. 62/281,834, entitled "HYBRID AUTOMATIC REPEAT REQUEST FEEDBACK FOR UNICAST SIDELINK COMMUNICATIONS" and filed on Jan. 22, 2016, which is expressly incorporated by reference herein in its entirety.

BACKGROUND

Field

The present disclosure relates generally to communication systems, and more particularly, to a device-to-device (D2D) wireless communications system that enables hybrid automatic repeat request (HARQ) feedback for unicast sidelink communications.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies. One problem with current D2D communications is that there is no physical layer feedback (e.g., HARQ feedback) for unicast sidelink communications. That is, the transmitting user equipment (UE) does not know if the receiving UE receives and/or properly decodes the unicast transmission. Instead, current D2D communications specify that a transmitting UE may send a unicast sidelink communication multiple times to increase the chances that the unicast sidelink communication is received by the receiving UE. By blindly transmitting unicast sidelink communications multiple times, the spectral efficiency and radio resource utilization of the network may be decreased.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One problem with current D2D communications is that there is no physical layer feedback (e.g., HARQ feedback) for unicast sidelink communications. That is, the transmitting UE does not know if the receiving UE receives and/or properly decodes the unicast transmission. Instead, current D2D communications specify that a transmitting UE may send a unicast sidelink communication multiple times to increase the chances that the unicast sidelink communication is received by the receiving UE. By blindly transmitting unicast sidelink communications multiple times, the spectral efficiency and radio resource utilization of the network may be decreased.

The present disclosure provides a solution to the problem by enabling HARQ feedback for unicast sidelink communications that may increase spectral efficiency and may also provide better radio resource utilization for the network.

In an aspect of the disclosure, a method, a computer-readable medium, and an apparatus are provided. The apparatus transmits first sidelink control (SC) information associated with a first D2D communication to a second UE. The apparatus transmits the first D2D communication to the second UE, the first D2D communication including one or more first data. The apparatus receives, from the second UE, HARQ feedback associated with the first D2D communication.

In another aspect of the disclosure, the apparatus receives first SC information associated with a first D2D communication from a second UE. The apparatus receives the first D2D communication from the second UE, the first D2D communication including one or more first data. The apparatus performs a HARQ procedure for the first D2D communication. The apparatus transmits, to the second UE, HARQ feedback associated with the first D2D communication.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
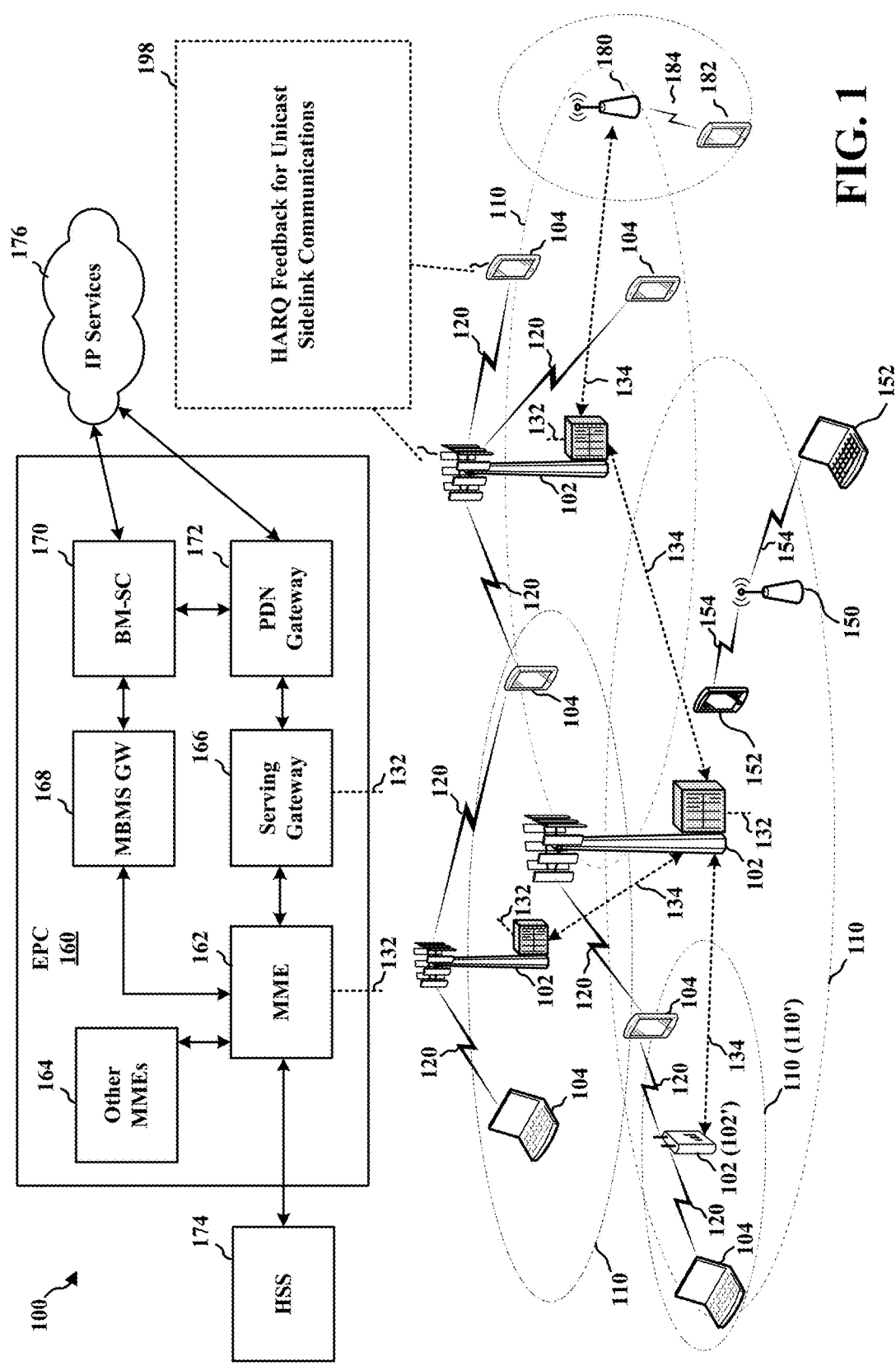
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The millimeter wave (mmW) base station 180 may operate in mmW frequencies and/or near mmW frequencies in communication with the UE 182. Extremely high frequency (EHF) is part of the RF in the electromagnetic spectrum. EHF has a range of 30 GHz to 300 GHz and a wavelength between 1 millimeter and 10 millimeters. a radio wave in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band may have extremely high path loss and a short range. The mmW base station 180 may utilize beamforming 184 with the UE 182 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to transmit and/or receive HARQ feedback associated with unicast sidelink communications (198).

Figures 2A, 2B, 2C, 2D:
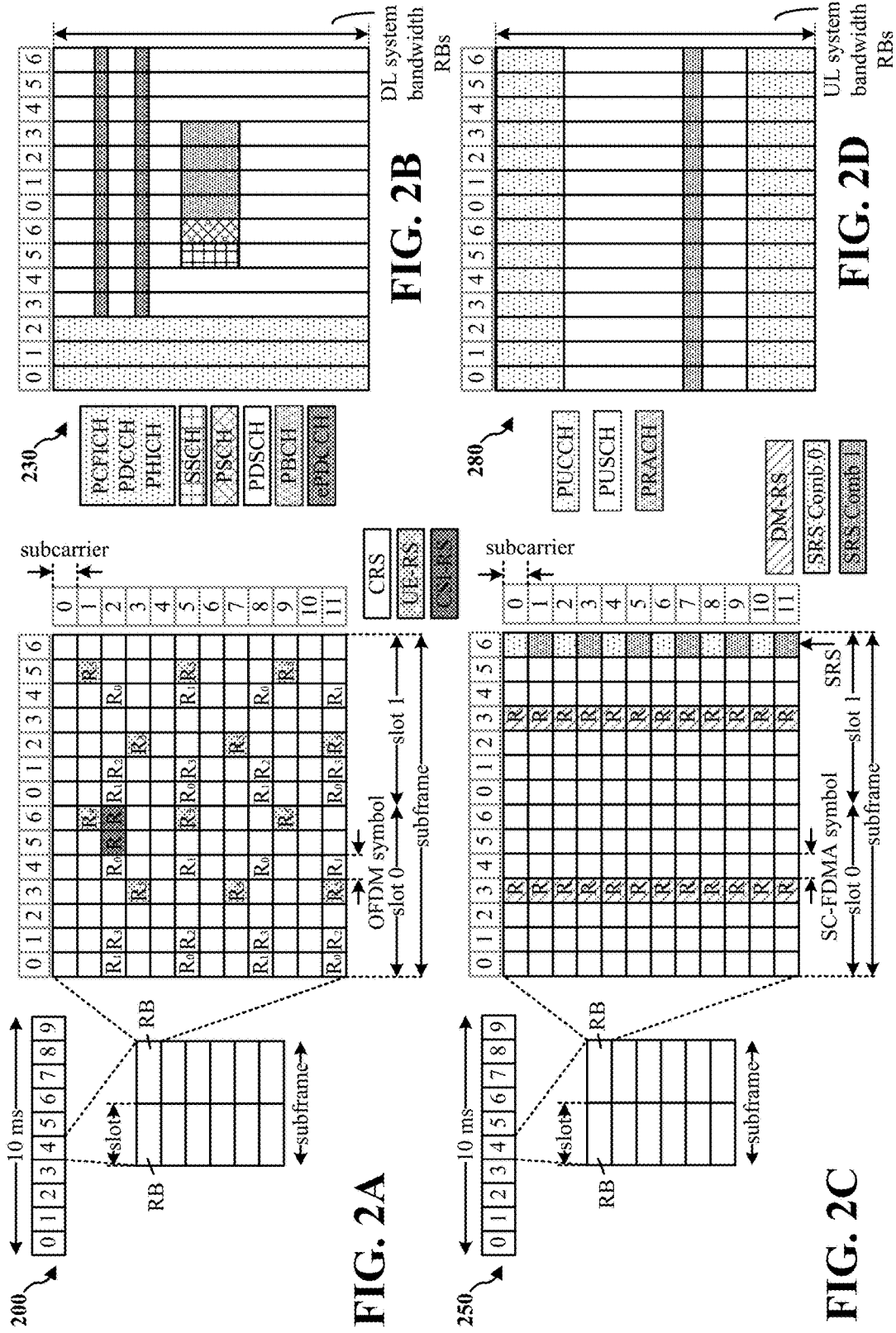
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
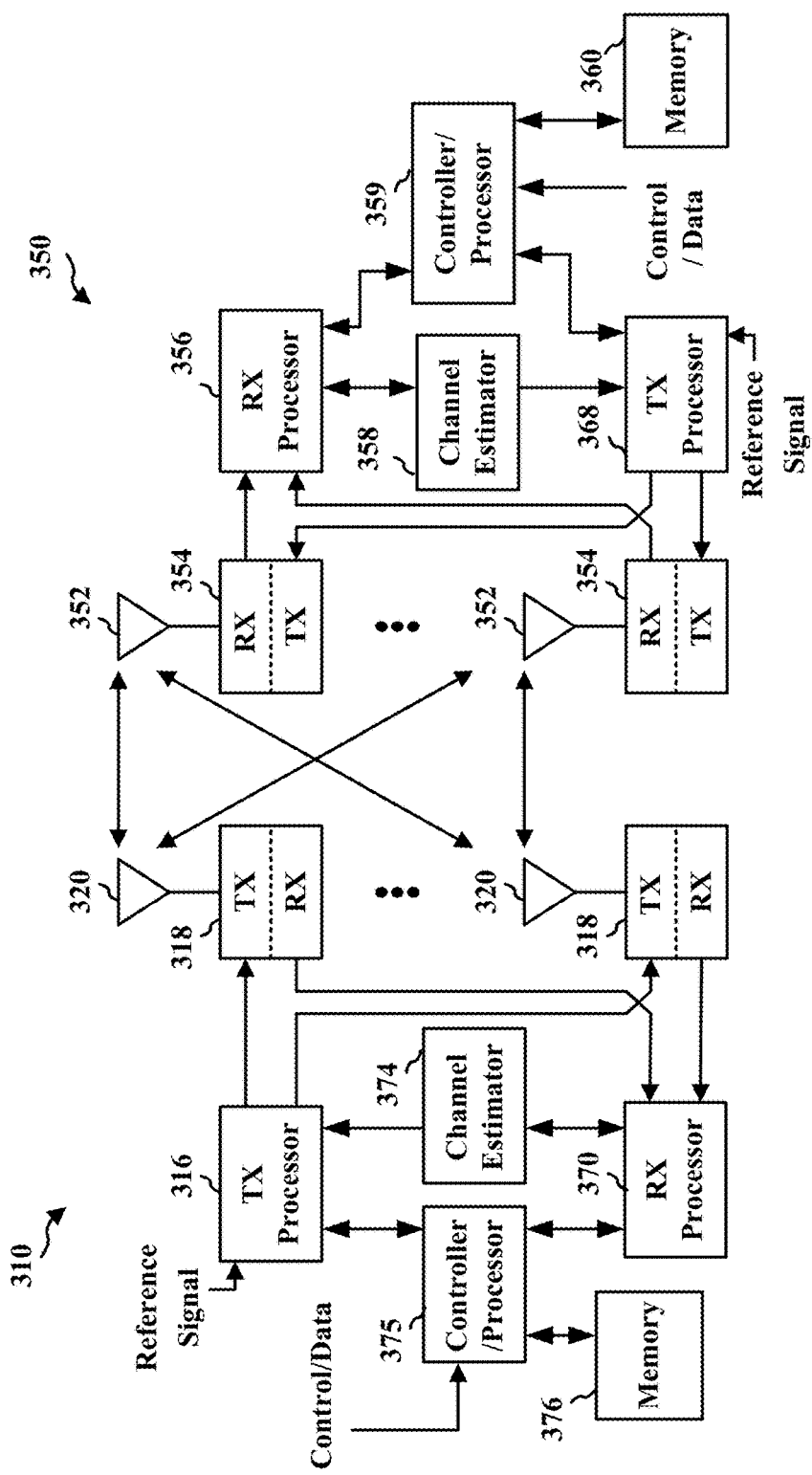
FIG. 3 is a diagram illustrating an example of an evolved Node B (eNB) and UE in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
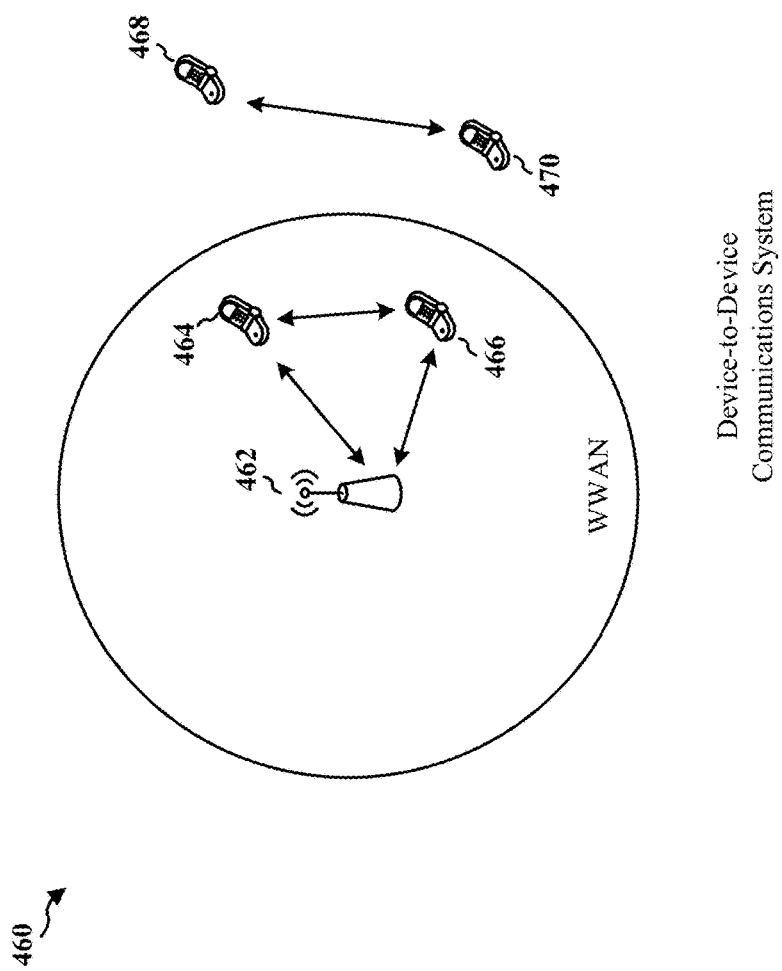
FIG. 4 is a diagram of a device-to-device communications system.

FIG. 4 is a diagram of a D2D communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH). In addition, the D2D communications may be one or more unicast sidelink communications in which a transmitting UE sends a D2D communication to a single receiving UE. Alternatively, the D2D communication may be a broadcast sidelink communication in which a transmitting UE sends a D2D communication to multiple receiving UEs. In an aspect, a unicast sidelink communication and/or a broadcast sidelink communication may include SC information and one or more MAC PDUs.

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless D2D communication systems.

One problem with current D2D communications is that there is no physical layer feedback (e.g., HARQ feedback) for unicast sidelink communications. That is, the transmitting UE does not know if the receiving UE receives and/or properly decodes the unicast sidelink communication. Instead, current D2D communications specify that a transmitting UE may send a unicast sidelink communication multiple times to increase the chances that the unicast sidelink communication is received by the receiving UE. By blindly transmitting unicast sidelink communications multiple times, the spectral efficiency and radio resource utilization of the network may be decreased.

The present disclosure provides a solution to the problem by enabling HARQ feedback for unicast sidelink communications that may increase spectral efficiency and may also provide increased radio resource utilization for the network.

Figure 5:
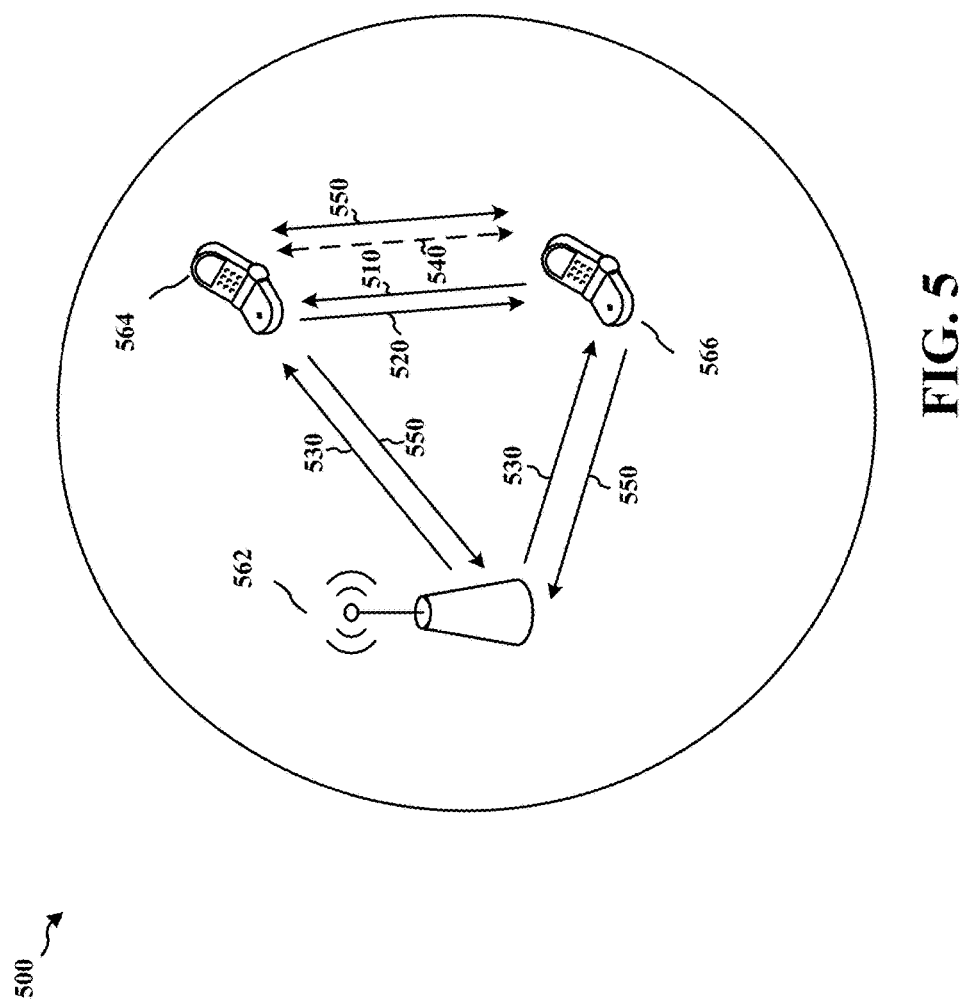
FIG. 5 is a diagram of a D2D communications system 500 that enables HARQ feedback (e.g., ACK/NACK transmission(s)) for unicast sidelink communications (e.g., D2D communications).

FIG. 5 is a diagram of a D2D communications system 500 that enables HARQ feedback (e.g., ACK/NACK transmission(s)) for unicast sidelink communications (e.g., D2D communications). The D2D communications system 500 includes, for example, a receiving UE 564, a transmitting UE 566, and an eNB 562. Although only two UEs are illustrated as being in D2D communication with one another in FIG. 5 for simplicity, both of the UEs may be in D2D communication with one another and with additional UEs without departing from the scope of the present disclosure.

As shown in FIG. 5, the transmitting UE 566 transmits a unicast sidelink communication(s) 510 to receiving UE 564. The unicast sidelink communication(s) 510 may include one or more SC information and one or more MAC PDUs. Each of the one or more MAC PDUs may be preceded by SC information. The SC information may, for example, indicate the RBs used for carrying the data of the MAC PDU (e.g., the data may include one or more data bits transmitted in different subframes). Further, the SC information may indicate the number of HARQ processes to be performed by the receiving UE 564. Furthermore, the SC information may include an SC L2 identification (SC L2 ID). Still further, the SC information may indicate a data format of the unicast sidelink communication 510. Further still, the SC information may include an indicator that indicates the data of the unicast sidelink communication is multiplexed with additional control information. For example, the additional control information may include at least one of a new data indicator (NDI) or a HARQ identification (HARQ ID). Additionally, the SC information may include a time resource pattern of transmission (T-RPT) pattern that indicates to the receiving UE 564 where in time and/or in which subframe data bits of the MAC PDU will be transmitted. A more detailed description of a unicast sidelink communications is discussed infra with respect to FIGS. 6 and 7.

Figure 6:
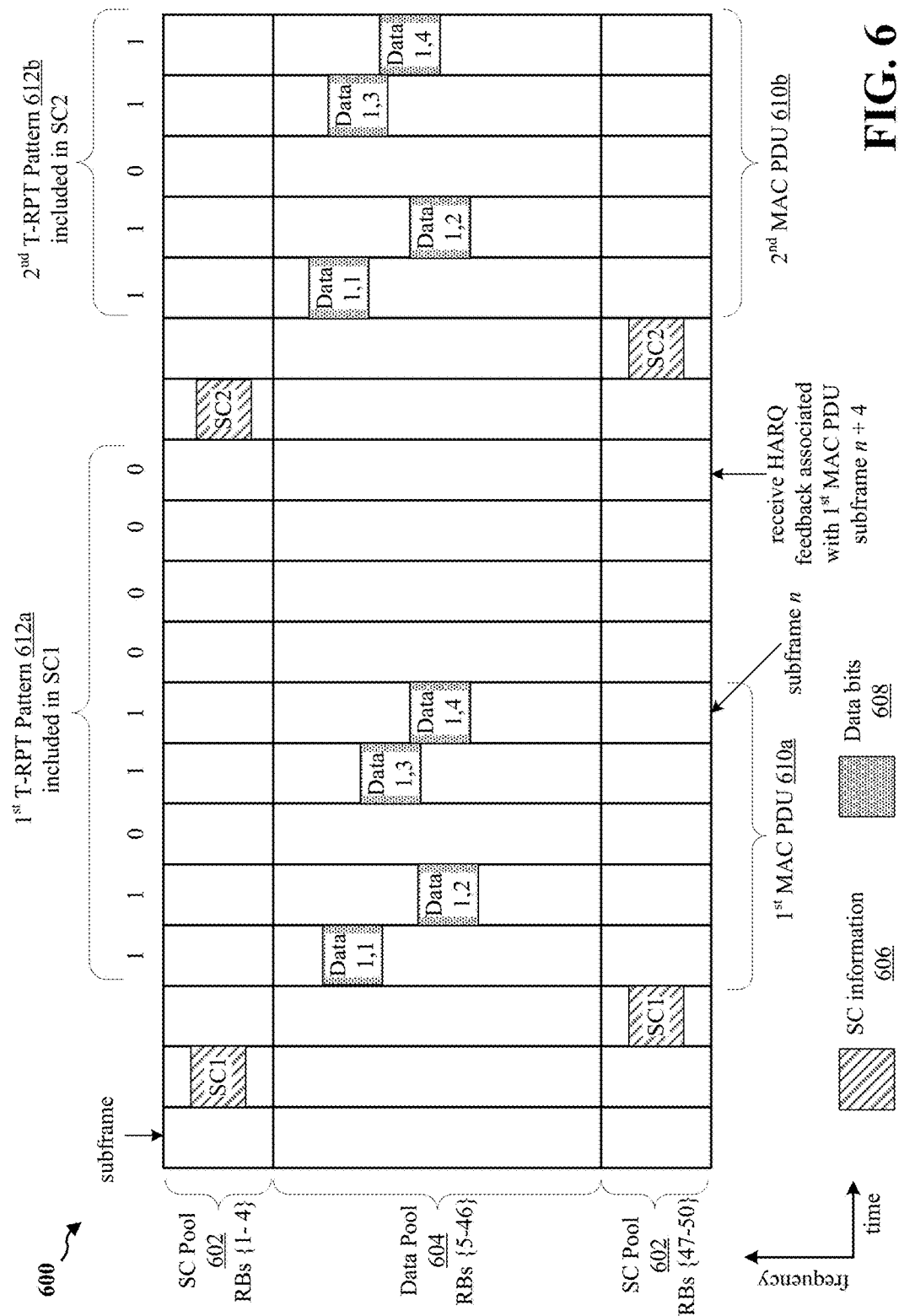
FIG. 6 is a diagram illustrating unicast sidelink communication(s) 600 in accordance with certain aspects of the present disclosure.

FIG. 6 is a diagram illustrating unicast sidelink communication(s) 600 in accordance with certain aspects of the present disclosure. For example, the unicast sidelink communication(s) 600 illustrated in FIG. 6 includes SC information 606 and data bits 608 of two different MAC PDUs 610*a*, 610*b*. In an aspect, SC information 606 may be transmitted using an SC pool 602 made up of RBs located at the outer edges of the frequency domain. In the example illustrated in FIG. 6, the SC pool 602 is made up of RBs {1, 2, 3, 4, 47, 48, 49, 50}, and SC information 606 is transmitted using the RBs of the SC pool 602.

In addition, MAC PDU(s) 610*a*, 610*b* may be transmitted using a data pool 604 made up of RBs located between RBs of the SC pool 602. In the example illustrated in FIG. 6, the data pool 604 is made up of RBs {5-46}, and data bits 608 of a first MAC PDU 610*a* and a second MAC PDU 610*b* are transmitted using the RBs of the data pool 604. Each of the two MAC PDUs 610*a*, 610*b* illustrated in FIG. 6 are made up of 4 data bits 608. For example, the data bits 608 of the first MAC PDU 610*a* are Data (1,1), Data (1,2), Data (1,3), and Data (1,4). The data bits 608 of the second MAC PDU 610*b* are Data (2,1) Data (2,2), Data (2,3), and Data (2,4). Although two MAC PDUs are illustrated in the unicast sidelink communication(s) 600 in FIG. 6, more or fewer MAC PDUs may be included in the unicast sidelink communication(s) 600 without departing from the scope of the present disclosure.

Still referring to FIG. 6, the first MAC PDU 610*a* is preceded by SC information 606 (e.g., SC1) transmitted in two subframes prior to subframes used to transmit data bits 608 of the first MAC PDU 610*a*. In an aspect, the SC1 information may include a first T-RPT pattern 612*a* that indicates to the receiving UE 564 where in time and/or in which subframes the data bits 608 of the first MAC PDU 610*a* will be transmitted. For example, the first T-RPT pattern 612*a* is "11011000". In this example, a value of "1" indicates that a data bit 608 of the first MAC PDU 610*a* will be transmitted in that particular subframe, and a value of "0" indicates that a data bit 608 of the first MAC PDU 610*a* will not be transmitted in that particular subframe.

Similarly, the second MAC PDU 610*b* is preceded by SC information 606 (e.g., SC2) transmitted in both of the two subframes prior to subframes used to transmit data bits 608 of the second MAC PDU 610*b*. In an aspect, the SC2 information may include a second T-RPT pattern 612*b* that indicates to the receiving UE 564 where in time and/or in which subframes the data bits 608 of the second MAC PDU 610*b* will be transmitted. For example, the second T-RPT pattern 612*b* is "11011". Here again, a value of "1" indicates that a data bit 608 of the second MAC PDU 610*b* will be transmitted in that particular subframe, and a value of "0" indicates that a data bit 608 of the second MAC PDU 610*b* will not be transmitted in that particular subframe. While values of "1" and "0" are used to indicate whether or not data bits 608 of a MAC PDU 610*a*, 610*b* will be transmitted in a particular subframe in FIG. 6, these particular values are not intended to be limiting.

With further reference to FIG. 6, the SC information 606 and data bits 608 of the MAC PDUs 610*a*, 610*b* may be frequency domain multiplexed. By multiplexing the data bits 608 of the MAC PDUs 610*a*, 610*b* in the frequency domain, the SC information 606 may be transmitted on any subframe and a single MAC PDU may be sent for each SC information transmission (e.g., the first MAC PDU 610*a* for the SC1 transmission and the second MAC PDU 610*b* for the SC2 transmission). In addition, data bits 608 of different MAC PDUs may be interleaved if new SC information is transmitted before the last data bit of the preceding MAC PDU is transmitted. For example, referring to FIG. 6, if SC2 is transmitted before the transmission of the last data bit (e.g., Data 1,4) of the first MAC PDU 610*a*, one or more of the data bits 608 in the second MAC PDU 610*b* may be interleaved with the remaining data bits 608 of the first MAC PDU 610*a*.

In an aspect, a T-RPT pattern may be restricted such that a predetermined subframe after the last subframe in which a data bit of the MAC PDU has a value of "0" to enable HARQ feedback (e.g., ACK/NACK transmission(s)) related to the data bits of the MAC PDU.

For example, referring again to FIG. 6, if subframe n is the last subframe in which a data bit 608 of the first MAC PDU 610*a* is transmitted, and the ACK/NACK transmission of the HARQ feedback is configured for transmission in subframe n+4, then the first T-RPT pattern 612*a* may be restricted to have a value of "0" that corresponds to the n+4 subframe so that the transmitting UE 566 will not transmit another unicast sidelink communication in the n+4 subframe.

Figure 7:
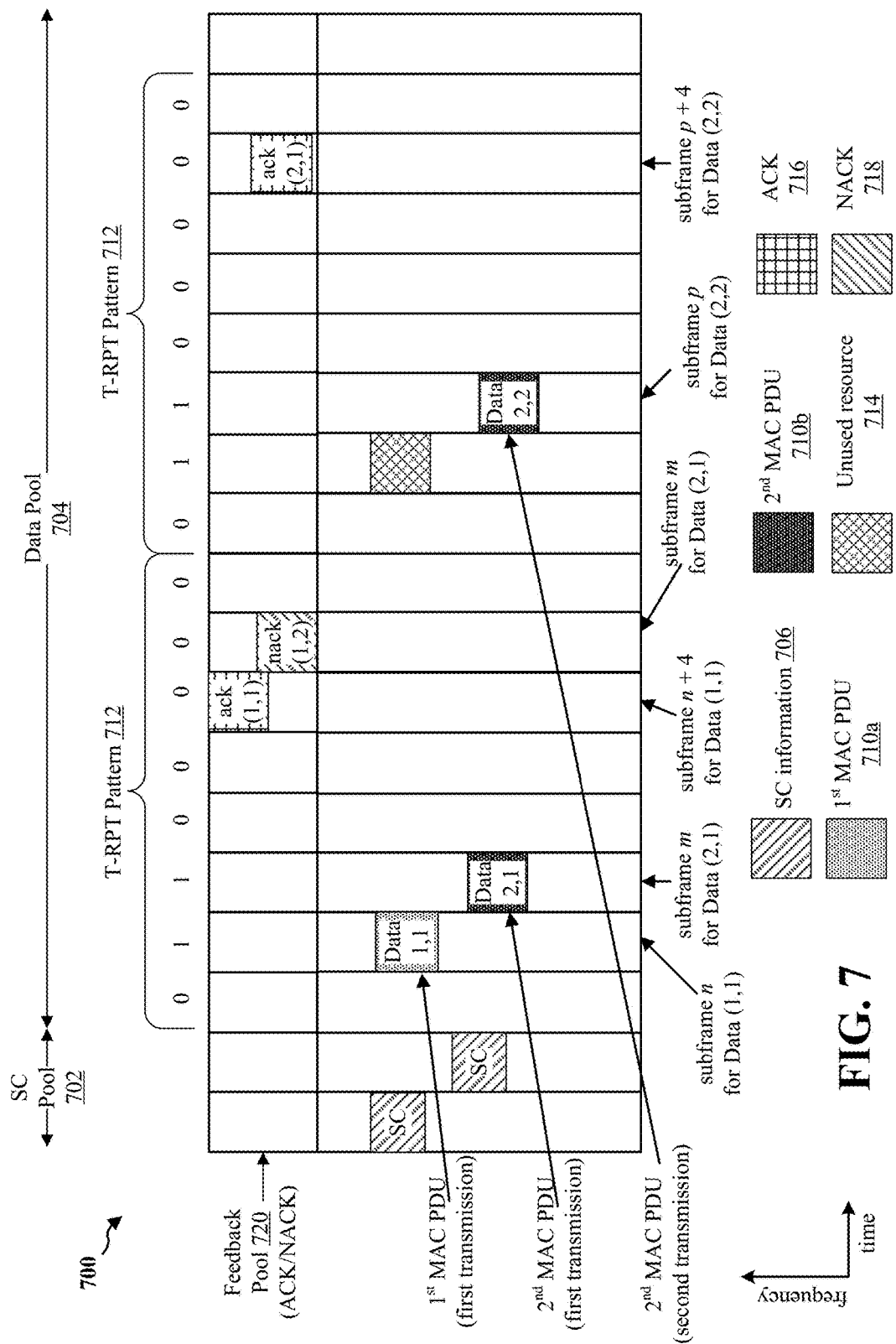
FIG. 7 is a diagram illustrating unicast sidelink communication(s) 700 in accordance with certain aspects of the present disclosure.

Instead, referring back to FIG. 5, the receiving UE 564 may send an ACK/NACK transmission 520 to the transmitting UE 566 in response to the unicast sidelink communication 510 in subframe n+4 as illustrated in FIGS. 6 and 7. That is, RBs used for ACK/NACK transmission(s) 520 by the receiving UE 564 may be frequency division multiplexed with the RBs for the SC pool 602 and data pool 604 used for unicast sidelink communications 510. In addition, multiple ACK/NACK transmissions may be mapped to the same RBs and may be code division multiplexed (e.g. similar to PUCCH multiplexing using orthogonal shifts of a base sequence and/or a cover sequence). In an aspect, the ACK/NACK transmission 520 may be interleaved with a unicast sidelink communication transmitted from the receiving UE 564 to the transmitting UE 566.

Referring again to FIG. 5, the RBs and code division multiplexing information of the ACK/NACK transmissions may be determined at the receiving UE 564 based on RBs used by the transmitting UE 566 in transmitting the SC information and/or the SC L2 ID.

Alternatively, the location of the RBs used for transmitting the ACK/NACK transmission 520 may be configured by eNB 562 in information 530 (e.g., an RRC message) transmitted to one or both of the UEs 564, 566. In another aspect, the UEs 564, 566 may exchange information 540 related to the RBs and/or the code division multiplexing used for the ACK/NACK transmission(s) 520 when unicast communication is setup between the UEs 564, 566. Additionally and/or alternatively, the UEs 564, 566 may exchange information 550 with each other or with the eNB 562 to ensure that the RBs are properly configured for the ACK/NACK transmission(s) 520. In an aspect, the RBs used for the ACK/NACK transmission(s) 520 may be link specific.

In addition, SC information in the unicast sidelink communication 510 may include an indication of the MAC PDU format. For example, the MAC PDU format may be indicated by a predetermined bit value (e.g., NDI) in the SC information. For example, an NDI bit value of "1" may be used to indicate the MAC PDU format illustrated in FIG. 6. Alternatively, an NDI bit value of "0" may be used to indicate the MAC PDU format discussed infra with respect to FIG. 7.

Referring back to FIG. 5, when the SC information includes an NDI value of "1", the SC information and the data bits of the MAC PDUs may be multiplexed (e.g., similar to PUSCH/PUCCH multiplexing). In addition, the SC information may include additional control information such as a HARQ ID (e.g., 2 bits), and optionally an indicator associated with the ACK/NACK transmission 520 (e.g., 2 bits if the receiving UE 564 is also transmitting in the same subframe). Using different DM-RS to indicate the SC information (e.g., NDI, HARQ ID) may be avoided so that blind detection at the receiving UE 564 is avoided.

In an instance when a unicast sidelink communication 510 collides with a ACK/NACK transmission 520, the ACK/NACK transmission 520 may be prioritized such that the ACK/NACK transmission 520 is received at the transmitting UE 566 but the unicast sidelink communication 510 is not received at the receiving UE 564. Optionally, the ACK/NACK transmission 520 may be multiplexed with the unicast sidelink communication being transmitted by the receiving UE 564. The SC information included in a unicast sidelink communication transmitted by the receiving UE 564 may include a two bit value to indicate the presence or absence of an ACK and/or a NACK (e.g., the ACK/NACK transmission 520 is multiplexed with the unicast sidelink communication). For example, a two bit value of "00" may be used to indicate that neither an ACK nor a NACK are included in the transmission. A two bit value of "01" may be used to indicate the presence of an ACK and an absence of a NACK, and a two bit value of "10" may be used to indicate the presence of a NACK and an absence of an ACK. The transmitting UE 566 may determine which RBs are being used to transmit the ACK and/or NACK, and if the ACK and/or NACK are multiplexed with a unicast sidelink communication from the receiving UE 564 based on information 540 (e.g., related to the RBs) that is exchanged during unicast sidelink communication setup between the UEs 564, 566 or by exchanging information 550, 530 with the eNB 562.

According to another aspect, the SC information may indicate the number of HARQ processes to be performed on the unicast sidelink communication(s) 510 at the receiving UE 564. For example, the ACK/NACK transmission(s) 520 for different MAC PDUs may be interleaved by the receiving UE 564 when the ACK/NACK transmission(s) 520 are transmitted to the transmitting UE 566.

In an example embodiment, if the T-RPT indicated in the SC information is equal to 11110000, and the number of HARQ processes related to the unicast sidelink transmission 510 is 2, the receiving UE 564 may assume a HARQ ID of 1212----. Here, the value of "1" in the HARQ ID indicates the first MAC PDU and the value "2" indicates the second MAC PDU.

FIG. 7 is a diagram illustrating unicast sidelink communication(s) 700 in accordance with certain aspects of the present disclosure. As illustrated in FIG. 7, SC information 706 may be transmitted using an SC pool 702 made up of RBs (e.g., 5-50) located in the first two subframes of a unicast sidelink communication 700. The SC information 706 may include a "0" value indicating the MAC PDU format illustrated in FIG. 7. In addition, the SC information 706 may indicate a T-RPT pattern 712 of "01100000". The SC information 706 in FIG. 7 may also indicate the number of HARQ processes to be performed by the receiving UE 564. In the example illustrated in FIG. 7, the number of HARQ processes indicated is two. Thus, a maximum of 2 MAC PDUs may be sent in the unicast sidelink communication 700.

In an aspect, the MAC PDU(s) 710*a*, 710*b* may be transmitted using a data pool 704 made up of RBs (e.g., 5-50) located in subframes of the unicast sidelink communication 700 subsequent to the SC pool 702. In addition, HARQ feedback may be transmitted using the feedback pool 720. In the example illustrated in FIG. 7, the data bits (not illustrated in FIG. 7) of the first MAC PDU 710*a* and of the second MAC PDU 710*b* may be transmitted using the RBs of the data pool 704 in an interleaved fashion. Although two MAC PDUs are illustrated in the unicast sidelink communication(s) 700 in FIG. 7, more or fewer MAC PDUs may be included in the unicast sidelink communication(s) without departing from the scope of the present disclosure.

In an aspect, Data (a,b) indicates MAC PDU "a" and retransmission "b". For example, Data (1,1) indicates the first transmission of a first MAC PDU 710*a*. Similarly, Data (2,1) indicates the first transmission of a second MAC PDU 710*b*, and Data (2,2) indicates the second transmission (e.g., first retransmission) of the second MAC PDU 710*b*. In the example embodiment of FIG. 7, the receiving UE 564 is transmitting HARQ feedback in an interleaved manner (e.g., 1212---).

For example, HARQ feedback (e.g., ack (1,1)) associated with the first transmission of the first MAC PDU 710*a* located at subframe n is transmitted and/or received in subframe n+4. HARQ feedback (e.g., nack (1,2)) associated with the first transmission of the second MAC PDU 710*b* located at subframe m is received in subframe m+4. HARQ feedback (e.g., ack (2,1)) associated with the first retransmission of the second MAC PDU 710*b* located in subframe p is received in subframe p+4.

Once an ACK 716 (e.g., ack (1,1)) is received for the first MAC PDU 710*a*, a retransmission of the first MAC PDU 710*a* is not sent on that HARQ process. In other words, there is an unused resource 714 where a retransmission of the first MAC PDU 710*a* would have occurred had a NACK been received. By having an unused resource 714, an NDI may not be needed in the MAC PDU. As also illustrated in FIG. 7, since the first transmission of the second MAC PDU 710*b* (e.g., Data (2, 1)) received a NACK 718 (e.g., nack (1,2), the transmitting UE 566 retransmits the second MAC PDU 710*b* (e.g., Data (2,2)).

Figure 8A:
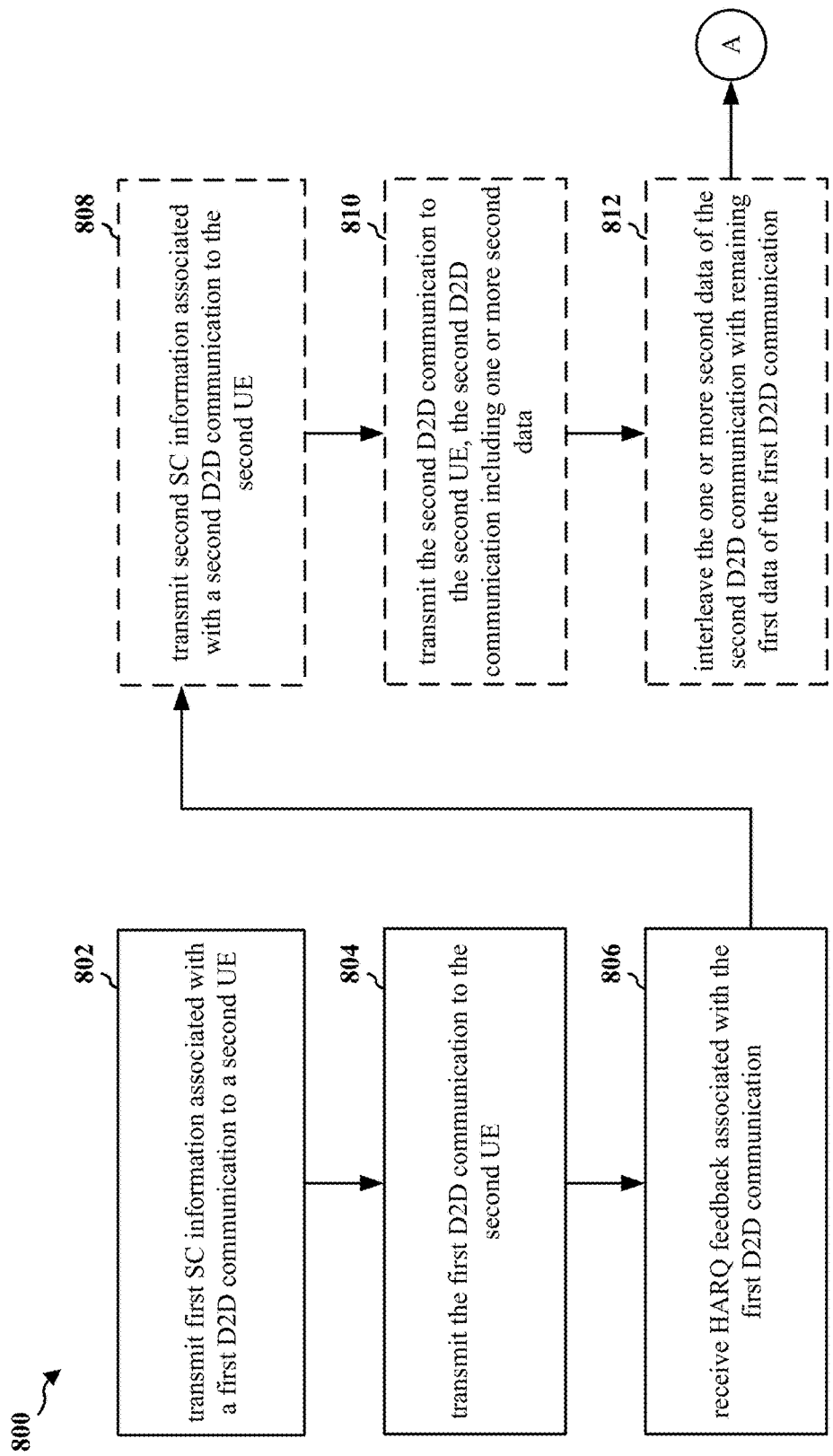
FIGS. 8A and 8B are a flowchart of a method of wireless communication.
Figure 8B:
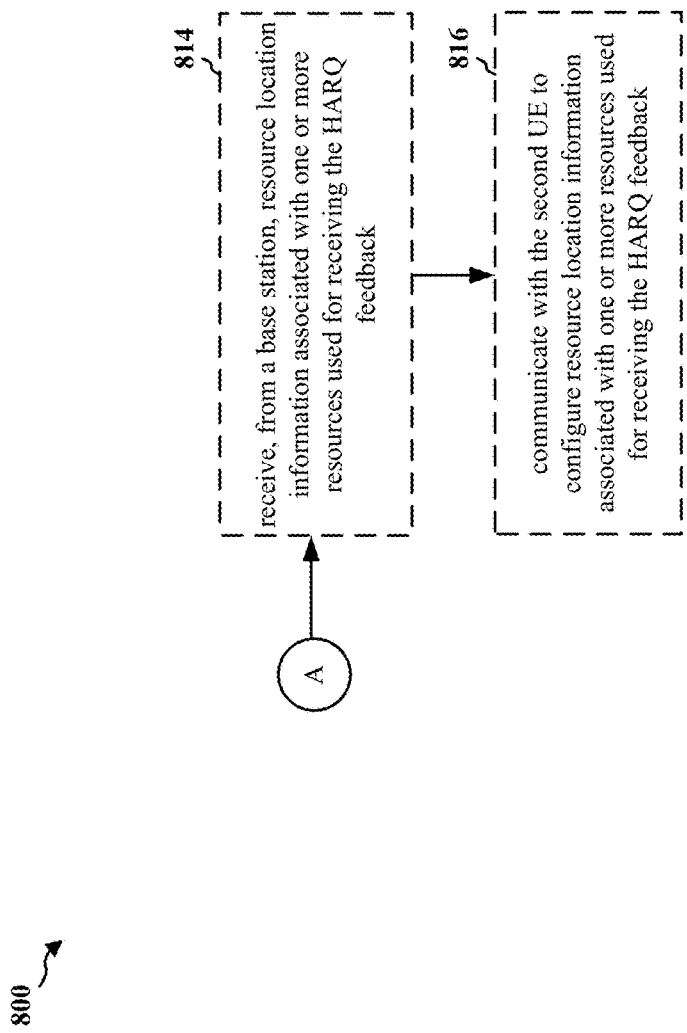

FIGS. 8A and 8B are a flow chart 800 of a method of wireless communication in accordance with various aspects. The method may be performed by a first UE (e.g., the transmitting UE 566) that is in D2D communication with a second UE (e.g., the receiving UE 564). Operations indicated with dashed lines represent optional operations for various aspects of the disclosure.

As shown in FIG. 8A, at 802, the first UE may transmit first SC information associated with a first D2D communication to a second UE. For example, referring to FIG. 5, SC information may be transmitted by the transmitting UE 566 prior to each MAC PDU. The SC information may, for example, indicate the RBs used for carrying the data of the MAC PDU (e.g., the data may include one or more data bits transmitted in different subframes). Further, the SC information may indicate the number of HARQ processes to be performed by the receiving UE 564 based on the unicast sidelink communication(s) 510. Furthermore, the SC information may include an SC L2 identification (SC L2 ID). Still further, the SC information may indicate a data format of the unicast sidelink communication 510. Additionally, the SC information may include a time resource pattern of transmission (T-RPT) pattern that indicates to the receiving UE 564 where in time and/or in which subframe data bits of the MAC PDU will be transmitted. Referring to FIG. 6, the SC information 606 may be transmitted using an SC pool 602 made up of RBs located at the outer edges of the allocated resources. In the example illustrated in FIG. 6, the SC pool 602 is made up of RBs {1, 2, 3, 4, 47, 48, 49, 50}, and SC information 606 is transmitted using the RBs of the SC pool 602.

Referring back to FIG. 8A, at 804, the first UE may transmit the first D2D communication to the second UE. In an aspect, the first D2D communication may include one or more first data. In addition, the first D2D communication may be a unicast sidelink communication that includes one or more MAC PDUs. For example, referring to FIG. 5, the transmitting UE 566 may send a unicast sidelink communication(s) 510 to receiving UE 564. The unicast sidelink communication(s) 510 may include one or more MAC PDUs transmitted to the receiving UE 564. With reference to FIG. 6, the MAC PDU(s) may be transmitted using a data pool 604 made up of RBs located between RBs of the SC pool 602. In the example illustrated in FIG. 6, the data pool 604 is made up of RBs {5-46}, and data bits 608 of a first MAC PDU 610a and a second MAC PDU 610b are transmitted using the RBs of the data pool 604. Each of the two MAC PDUs 610a, 610b illustrated in FIG. 6 are made up of 4 data bits. Although two MAC PDUs are illustrated in the unicast sidelink communication(s) 600 in FIG. 6, more or fewer MAC PDUs may be included in the unicast sidelink communication(s) without departing from the scope of the present disclosure.

Referring again to FIG. 8A, at 806, the first UE may receive, from the second UE, HARQ feedback associated with the first D2D communication. In one aspect, the HARQ feedback may be received in a predetermined subframe subsequent to a last subframe that includes a last data of the first D2D communication. In another aspect, the predetermined subframe may be reserved for the HARQ feedback. In a further aspect, the HARQ feedback may mapped to a same resource in the predetermined subframe as a resource used for transmitting at least one of the first SC information or the data. In yet a further aspect, the HARQ feedback may be multiplexed with a third D2D communication received from the second UE. For example, referring to FIG. 6, if subframe n is the last subframe in which a data bit 608 of the first MAC PDU 610a is transmitted, and the ACK/NACK transmission of the HARQ feedback is configured for transmission in subframe n+4, then the first T-RPT pattern 612a may be restricted to have a value of "0" such that the transmitting UE 566 does not transmit another unicast sidelink communication in subframe n+4. In another example, referring to FIG. 7, Data (1,1) indicates the first transmission of a first MAC PDU 710a. Similarly, Data (2,1) indicates the first transmission of a second MAC PDU 710b, and Data (2,2) indicates the second transmission (e.g., first retransmission) of the second MAC PDU 710b. In addition, the receiving UE 564 is transmitting for HARQ feedback in an interleaved manner (e.g., 1212---). Once an ACK is received for the first MAC PDU 710a, a retransmission of the first MAC PDU 710a is not sent on that HARQ process. In other words, there is an unused resource 714 where a retransmission of the first MAC PDU 710a would have been had a NACK been received.

Referring to FIG. 8A, at 808, the first UE may transmit second SC information associated with a second D2D communication to the second UE. For example, referring to FIG. 6, the second MAC PDU 610b is preceded by SC information 606 (e.g., SC2 information) transmitted in each of two subframes prior to subframes used to transmit data bits 608 of the second MAC PDU 610b. In an aspect, the SC2 information may include a second T-RPT pattern 612b that indicates to the receiving UE 564 where in time and/or in which subframes the data bits 608 of the second MAC PDU 610b will be transmitted. For example, the second T-RPT pattern 612b is "11011". Here again, a value of "1" indicates that a data bit 608 of the second MAC PDU 610b will be transmitted in that particular subframe, and a value of "0" indicates that a data bit 608 of the second MAC PDU 610b will not be transmitted in that particular subframe. While values of "1" and "0" are used to indicate whether or not data bits of a MAC PDU will be transmitted in a particular subframe, these particular values are not intended to be limiting.

Referring to FIG. 8A, at 810, the first UE may transmit the second D2D communication to the second UE, the second D2D communication including one or more second data. In an aspect, the second SC information is transmitted before transmission of a last one of the first data of the first D2D communication. For example, referring to FIG. 6, the second MAC PDU 610b is preceded by SC2 information transmitted in two subframes prior to subframes used to transmit data bits 608 of the second MAC PDU 610b. In an aspect, the SC2 information may include a second T-RPT pattern 612b that indicates to the receiving UE 564 where in time and/or in which subframes the data bits 608 of the second MAC PDU 610b will be transmitted. For example, the second T-RPT pattern is "11011". The value of "1" indicates that a data bit 608 of the second MAC PDU 610b will be transmitted in that particular subframe, and a value of "0" indicates that a data bit 608 of the second MAC PDU 610b will not be transmitted in that particular subframe. While values of "1" and "0" are used to indicate whether or not data bits of a MAC PDU will be transmitted in a particular subframe, these particular values are not intended to be limiting.

Referring to FIG. 8A, at 812, first UE may interleave the one or more second data of the second D2D communication with remaining first data of the first D2D communication. For example, referring to FIG. 6, the SC information 606 and data bits 608 of the MAC PDUs 610a, 610b may be frequency domain multiplexed. By multiplexing the SC information 606 and data bits 608 of the MAC PDUs 610a, 610b, the SC information 606 may be transmitted on any subframe and a single MAC PDU may be sent per SC information transmission. In addition, this may allow the data bits of different MAC PDUs to be interleaved if new SC information is transmitted before the last data bit of the preceding MAC PDU is transmitted. For example, still referring to FIG. 6, if SC2 is transmitted before the last data bit (e.g., Data 1,4) of the first MAC PDU 610*a* is transmitted, one or more of the data bits 608 in the second MAC PDU 610*b* may be interleaved with the remaining data bits 608 of the first MAC PDU 610*a*.

As seen in FIG. 8B, at 814, the first UE may receive, from a base station, resource location information associated with one or more resources used for receiving the HARQ feedback. For example, referring to FIG. 5, the location of the RBs used for transmitting the ACK/NACK transmission by configured by eNB 562 in an RRC message 530 transmitted to one or both of the UEs 564, 566.

Referring to FIG. 8B, at 816, the first UE may communicate with the second UE to configure resource location information associated with one or more resources used for sending/receiving the HARQ feedback. For example, referring to FIG. 5, when unicast communication is setup between the UEs 564, 566, the UEs 564, 566 may exchange information 540 related to the RBs and/or code division multiplexing used for the ACK/NACK transmission(s) 520.

Figure 9A:
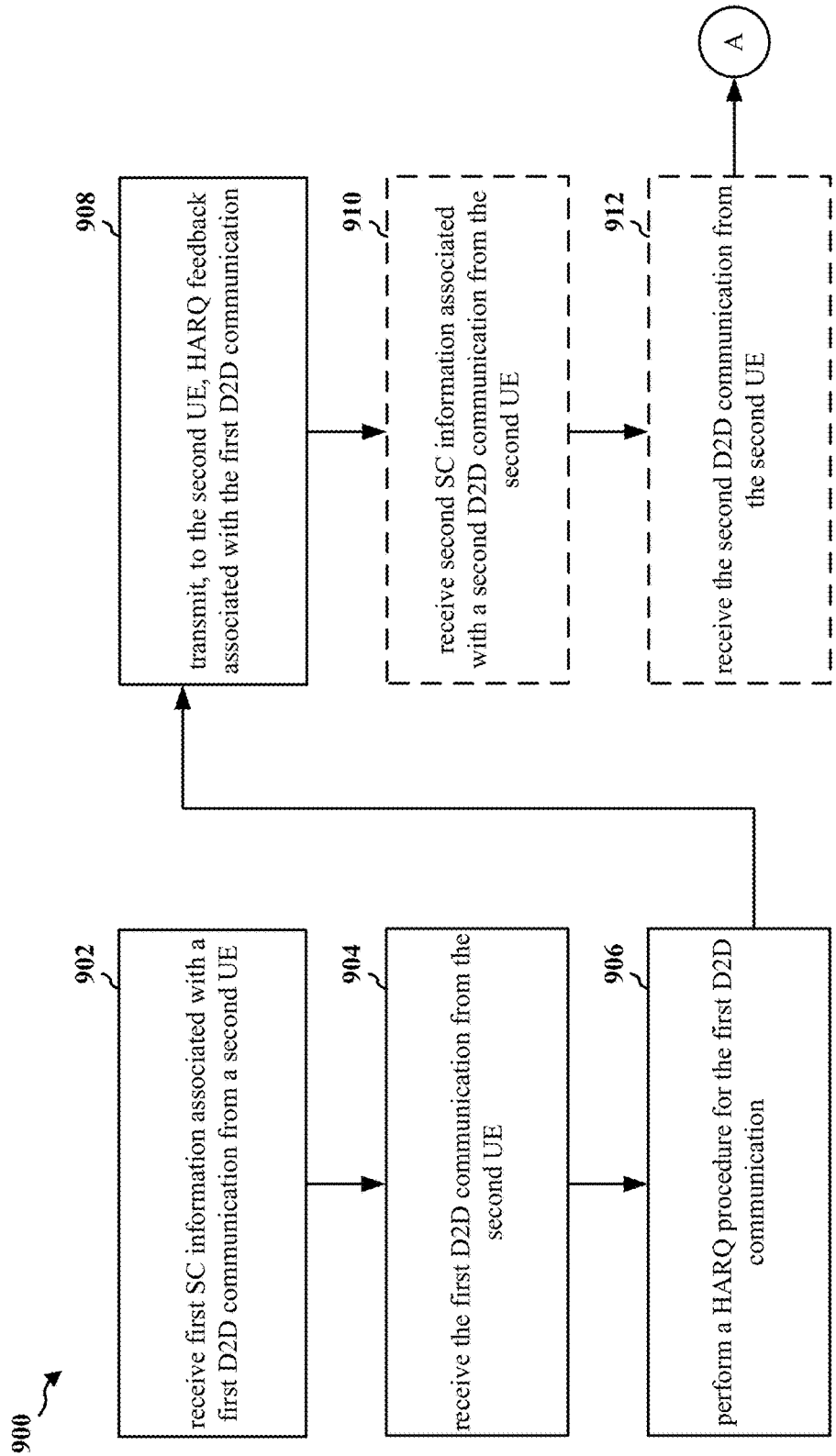
FIGS. 9A and 9B are a flowchart of a method of wireless communication.
Figure 9B:
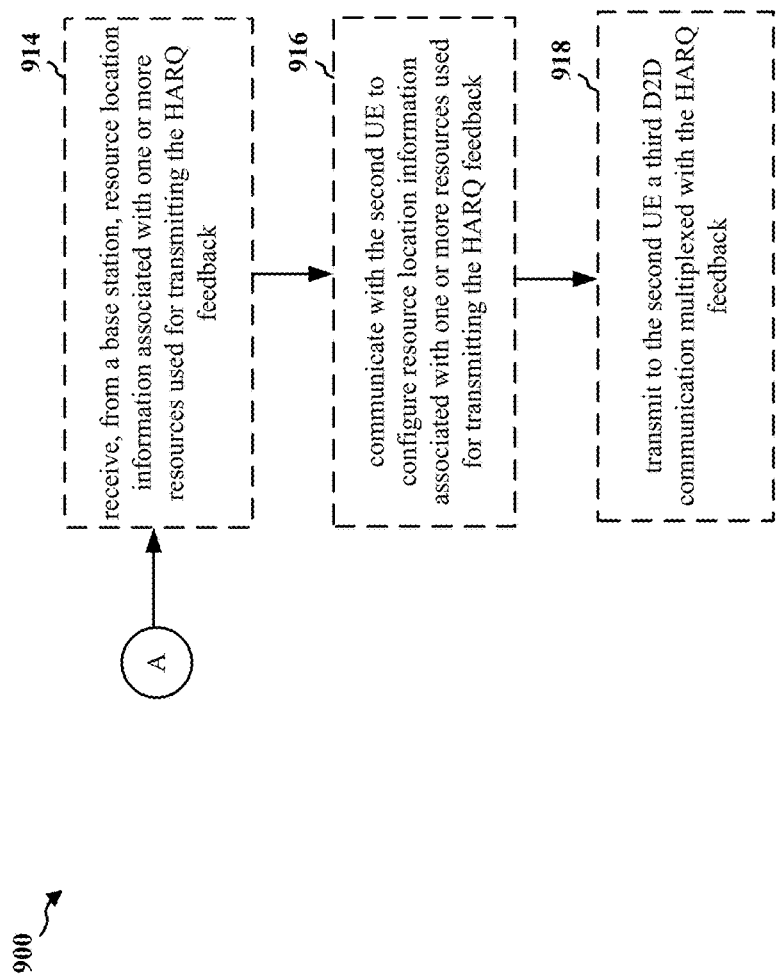

FIGS. 9A and 9B are a flow chart 900 of a method of wireless communication in accordance with various aspects. The method may be performed by a first UE (e.g., the receiving UE 564) in D2D communication with a second UE (e.g., the transmitting UE 566). The operations indicated with dashed lines represent optional operations for various aspects of the disclosure.

As seen in FIG. 9A, at 902, the first UE may receive first SC information associated with a first D2D communication from a second UE. For example, SC information may be transmitted by the transmitting UE 566 to the receiving UE 564 prior to each MAC PDU. The SC information may, for example, indicate the RBs used for carrying the data of the MAC PDU (e.g., the data may include one or more data bits transmitted in different subframes). Further, the SC information may indicate the number of HARQ processes to be performed by the receiving UE 564 based on the unicast sidelink communication(s) 510. Furthermore, the SC information may include an SC L2 identification (SC L2 ID). Still further, the SC information may indicate a data format of the unicast sidelink communication 510. Additionally, the SC information may include a time resource pattern of transmission (T-RPT) pattern that indicates to the receiving UE 564 where in time and/or in which subframe data bits of the MAC PDU will be transmitted. Referring to FIG. 6, the SC information 606 may be transmitted using an SC pool 602 made up of RBs located at the outer edges of the frequency domain. In the example illustrated in FIG. 6, the SC pool 602 is made up of RBs {1, 2, 3, 4, 47, 48, 49, 50}, and SC information 606 is transmitted using the RBs of the SC pool 602.

Referring to FIG. 9A, at 904, the first UE may receive the first D2D communication from the second UE. In a one aspect, the first D2D communication may include one or more first data. In addition, the first D2D communication may be a unicast sidelink communication that includes one or more MAC PDUs. For example, referring to FIG. 5, the transmitting UE 566 may send a unicast sidelink communication(s) 510 to receiving UE 564. The unicast sidelink communication(s) 510 may include one or more MAC PDUs transmitted to the receiving UE 564. With reference to FIG. 6, the MAC PDU(s) may be transmitted using a data pool 604 made up of RBs located between RBs of the SC pool 602. In the example illustrated in FIG. 6, the data pool is made up of RBs {5-46}, and data bits 608 of a first MAC PDU 610*a* and a second MAC PDU 610*b* are transmitted using the RBs of the data pool 604. Each of the two MAC PDUs 610*a*, 610*b* illustrated in FIG. 6 are made up of 4 data bits.

Referring to FIG. 9A, at 906, the first UE may perform a HARQ procedure for the first D2D communication. For example, referring to FIG. 5, the SC information 706 transmitted in FIG. 7 may also indicate a number of HARQ processes to be performed by the receiving UE 564.

Referring to FIG. 9A, at 908, the first UE may transmit, to the second UE, HARQ feedback associated with the first D2D communication. In one aspect, the HARQ feedback may be transmitted in a predetermined subframe subsequent to a last subframe that includes a last data of the first D2D communication. In another aspect, the predetermined subframe may be reserved for the HARQ feedback. In a further aspect, the HARQ feedback may be mapped to a same resource in the predetermined subframe as a resource used for at least one of the first SC information or the data. For example, referring to FIG. 6, if subframe n is the last subframe in which a data bit 608 of the first MAC PDU 610*a* is transmitted, and the ACK/NACK transmission of the HARQ feedback is configured for transmission in subframe n+4, then the first T-RPT pattern 612*a* may be restricted to have a value of "0" such that the transmitting UE 566 does not transmit another unicast sidelink communication to the receiving UE 564 in that subframe. In another example, referring to FIG. 7, Data (1,1) indicates the first transmission of a first MAC PDU 710*a*. Similarly, Data (2,1) indicates the first transmission of a second MAC PDU 710*b*, and Data (2,2) indicates the second transmission (e.g., first retransmission) of the second MAC PDU 710*b*. Thus, the receiving UE 564 is transmitting for HARQ feedback in an interleaved manner (e.g., 1212---). Once an ACK 716 is received for the first MAC PDU 710*a*, a retransmission of the first MAC PDU 710*a* is not sent on that HARQ process. In other words, there is an unused resource 714 where a retransmission of the first MAC PDU 710*a* would have been had a NACK been received, which may avoid the need for NDI in the MAC PDU.

Referring to FIG. 9A, at 910, the first UE may receive second SC information associated with a second D2D communication from the second UE. For example, referring to FIG. 6, the second MAC PDU 610*b* is preceded by SC2 information transmitted in two subframes prior to subframes used to transmit data bits 608 of the second MAC PDU 610*b*. In an aspect, the SC2 information may include a second T-RPT pattern 612*b* that indicates to the receiving UE 564 where in time and/or in which subframes the data bits 608 of the second MAC PDU 610*b* will be transmitted. For example, the second T-RPT pattern 612*b* is "11011". Here again, a value of "1" indicates that a data bit 608 of the second MAC PDU 610*b* will be transmitted in that particular subframe, and a value of "0" indicates that a data bit 608 of the second MAC PDU 610*b* will not be transmitted in that particular subframe. While values of "1" and "0" are used to indicate whether or not data bits of a MAC PDU will be transmitted in a particular subframe, these particular values are not intended to be limiting.

Referring to FIG. 9A, at 912, the first UE may receive the second D2D communication from the second UE. In one aspect, the second D2D communication includes one or more second data. In another aspect, the second SC information is received before a last one of the first data of the first D2D communication. In yet another aspect, the second data of the second D2D communication may be interleaved with remaining first data of the first D2D communication. For example, referring to FIG. 6, the second MAC PDU 610b is preceded by SC information 606 (e.g. SC2) transmitted in two subframes prior to subframes used to transmit data bits 608 of the second MAC PDU 610b. In an aspect, the SC2 information may include a second T-RPT pattern 612b that indicates to the receiving UE 564 where in time and/or in which subframes the data bits 608 of the second MAC PDU 610b will be transmitted. For example, the second T-RPT pattern 612b is "11011". A value of "1" may indicate that a data bit 608 of the second MAC PDU 610b will be transmitted in that particular subframe, and a value of "0" indicates that a data bit 608 of the second MAC PDU 610b will not be transmitted in that particular subframe. While values of "1" and "0" are used to indicate whether or not data bits of a MAC PDU will be transmitted in a particular subframe, these particular values are not intended to be limiting.

As seen in FIG. 9B, at 914, the first UE may receive, from a base station, resource location information associated with one or more resources used for receiving the HARQ feedback. For example, referring to FIG. 5, the location of the RBs used for transmitting the ACK/NACK transmission by configured by eNB 562 in an RRC message 530 transmitted to one or both of the UEs 564, 566.

Referring to FIG. 9B, at 916, the first UE may communicate with the second UE to configure resource location information associated with one or more resources used for receiving the HARQ feedback. For example, referring to FIG. 5, when unicast communication is setup between the UEs 564, 566, the UEs 564, 566 may exchange information 540 related to the RBs and/or CDM used for the ACK/NACK transmission(s) 520.

Referring to FIG. 9B, at 918, the first UE may transmit to the second UE a third D2D communication. In an aspect, the HARQ feedback may be multiplexed with the third D2D communication. For example, referring to FIG. 5, the ACK/NACK transmission 520 may be multiplexed with the unicast sidelink communication being transmitted from the receiving UE 564 to the transmitting UE 566. The SC information included in the unicast sidelink communication being transmitted by the receiving UE 564 may include a two bit value to indicate the presence or absence of an ACK and/or a NACK. For example, a two bit value of "00" may be used to indicate that neither an ACK nor a NACK are included in the transmission to the transmitting UE 566. A two bit value of "01" may be used to indicate the presence of an ACK and an absence of a NACK, and a two bit value of "10" may be used to indicate the presence of a NACK and an absence of an ACK. The transmitting UE 566 may determine which RBs the receiving UE 564 is using for transmission to determine if the ACK/NACK transmission will be multiplexed with a unicast sidelink communication.

Figure 10:
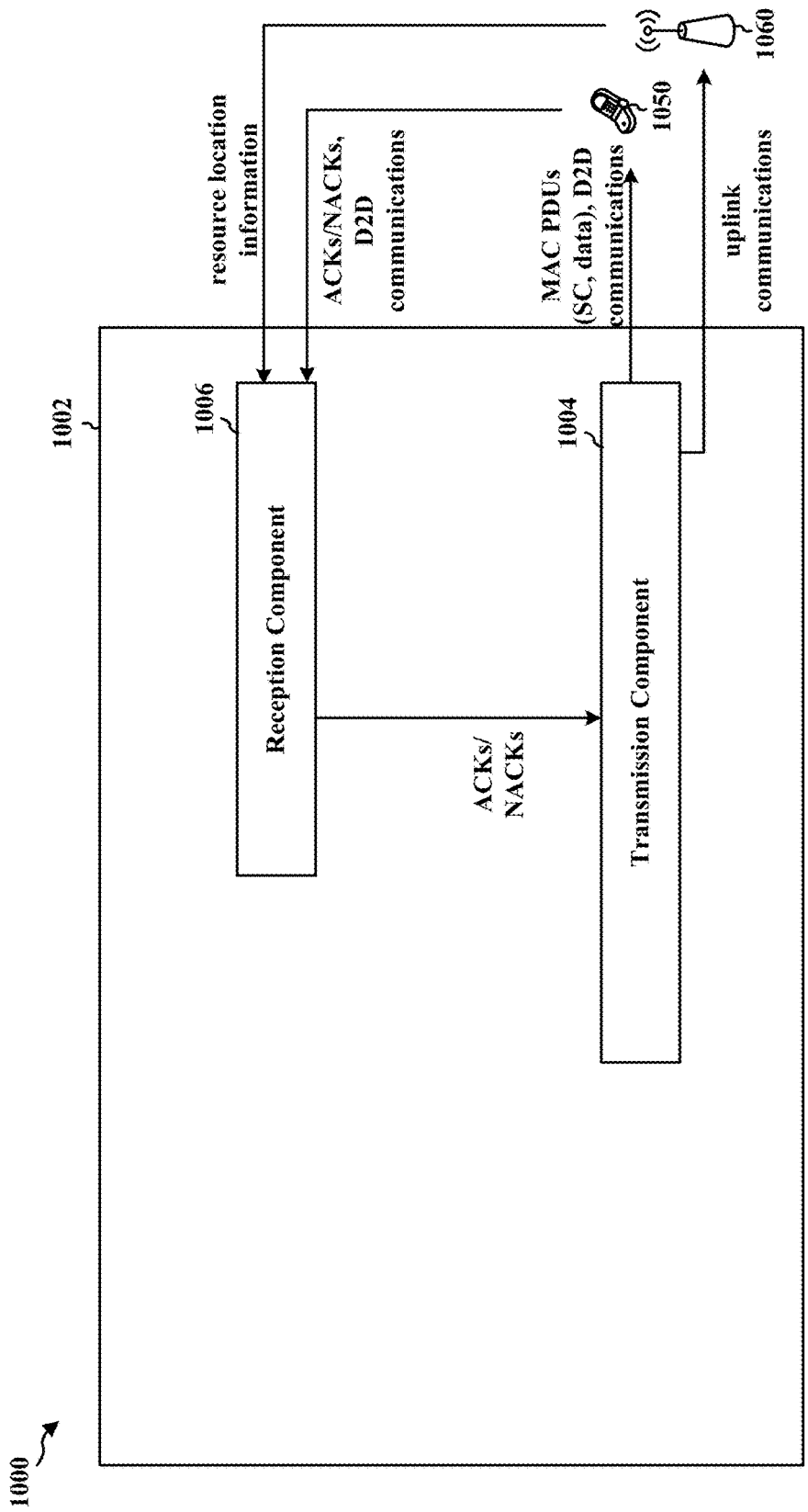
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus may be a first UE (e.g., transmitting UE 566) in communication with a second UE 1050 (e.g., receiving UE 564) and/or an eNB 1060. The apparatus includes a transmission component 1004 that transmits first SC information associated with a first D2D communication to a second UE and transmits the first D2D communication to the second UE, and a reception component 1006 that receives HARQ feedback associated with the first D2D communication The apparatus may include additional components that perform each of the blocks of the algorithm in the aforementioned flowcharts of FIGS. 8A and 8B. As such, each block in the aforementioned flowcharts of FIGS. 8A and 8B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
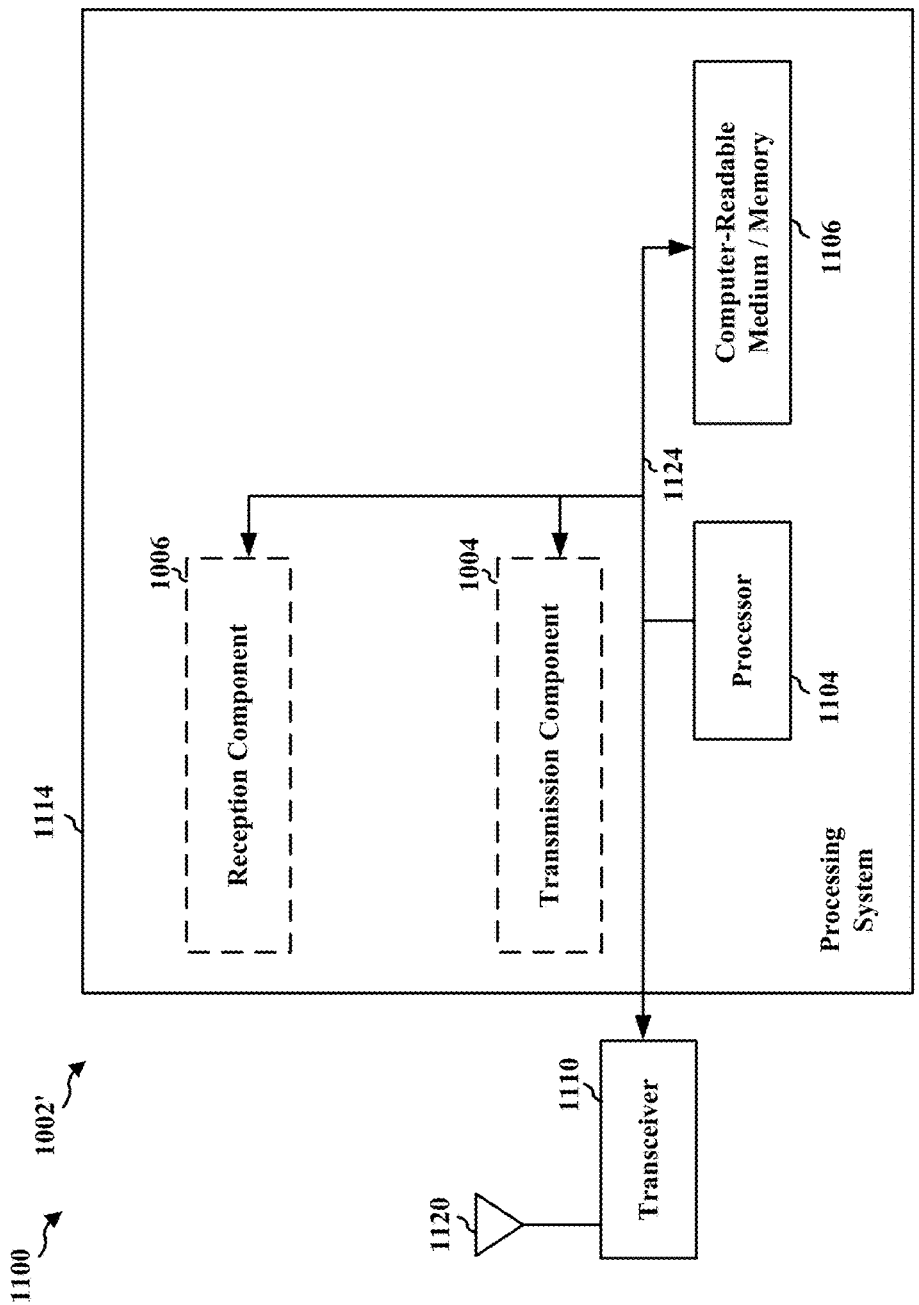
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1006, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1006. In addition, the transceiver 1110 receives information from the processing system 1114, specifically the transmission component 1004, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1004, 1006. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication includes means for transmitting first SC information associated with a first D2D communication to a second UE. In another configuration, the apparatus 1002/1002' for wireless communication includes means for transmitting the first D2D communication to the second UE. In an aspect, the first D2D communication may include one or more first data. In one aspect, the first D2D communication may include a first MAC PDU. In a further configuration, the apparatus 1002/1002' for wireless communication includes means for receiving, from the second UE, HARQ feedback associated with the first D2D communication. In one aspect, the HARQ feedback may be received in a predetermined subframe subsequent to a last subframe that includes a last data of the first D2D communication. In another aspect, the predetermined subframe may be reserved for the HARQ feedback. In yet another aspect, the HARQ feedback may be mapped to a same resource in the predetermined subframe as a resource used for transmitting at least one of the first SC information or the one or more first data. In still a further aspect, the HARQ feedback may be multiplexed with a third D2D communication received from the second UE. In still another configuration, the apparatus 1002/1002' for wireless communication includes means for transmitting second SC information associated with a second D2D communication to the second UE. In one aspect, the second SC information may be transmitted before transmission of a last one of the one or more first data of the first D2D communication. In a further configuration, the apparatus 1002/1002' for wireless communication includes means for transmitting the second D2D communication to the second UE. In an aspect, the second D2D communication may include one or more second data. In another configuration, the apparatus 1002/1002' for wireless communication includes means for interleaving the one or more second data of the second D2D communication with remaining first data of the first D2D communication. In a further configuration, the apparatus 1002/1002' for wireless communication includes means for receiving, from a base station, resource location information associated with one or more resources used for receiving the HARQ feedback. In yet a further configuration, the apparatus 1002/1002' for wireless communication includes means for communicating with the second UE to configure resource location information associated with one or more resources used for receiving the HARQ feedback. In still a further configuration, the apparatus 1002/1002' is configured to multiplex the one or more first data with additional control information. In one aspect, the first SC information may include an indicator that the one or more first data is multiplexed with the additional control information. In another aspect, the additional control information includes at least one of a new NDI or a HARQ ID. In a further aspect, the first SC information may include a number of HARQ processes being transmitted by the first UE. The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 12:
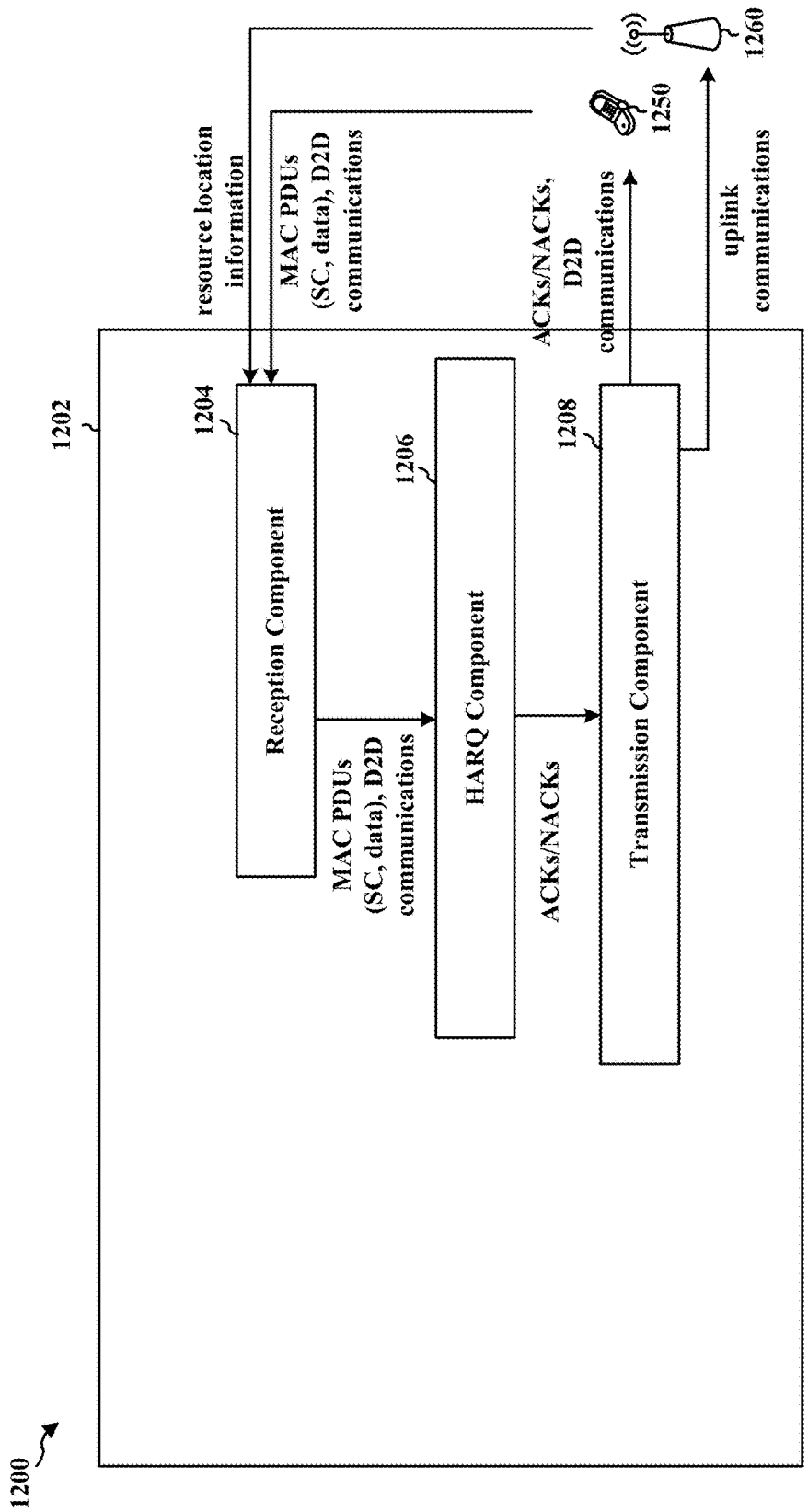
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a first UE (e.g., receiving UE 564) in communication with a second UE 1250 (e.g., transmitting UE 566) and/or an eNB 1260. The apparatus includes a reception component 1204 that receives first SC information associated with a first D2D communication from a second UE and receives the first D2D communication from the second UE, a HARQ component 1206 that performs a HARQ procedure for the first D2D communication, and a transmission component 1208 that transmits, to the second UE, HARQ feedback associated with the first D2D communication.

The apparatus may include additional components that perform each of the blocks of the algorithm in the aforementioned flowcharts of FIGS. 9A and 9B. As such, each block in the aforementioned flowcharts of FIGS. 9A and 9B may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
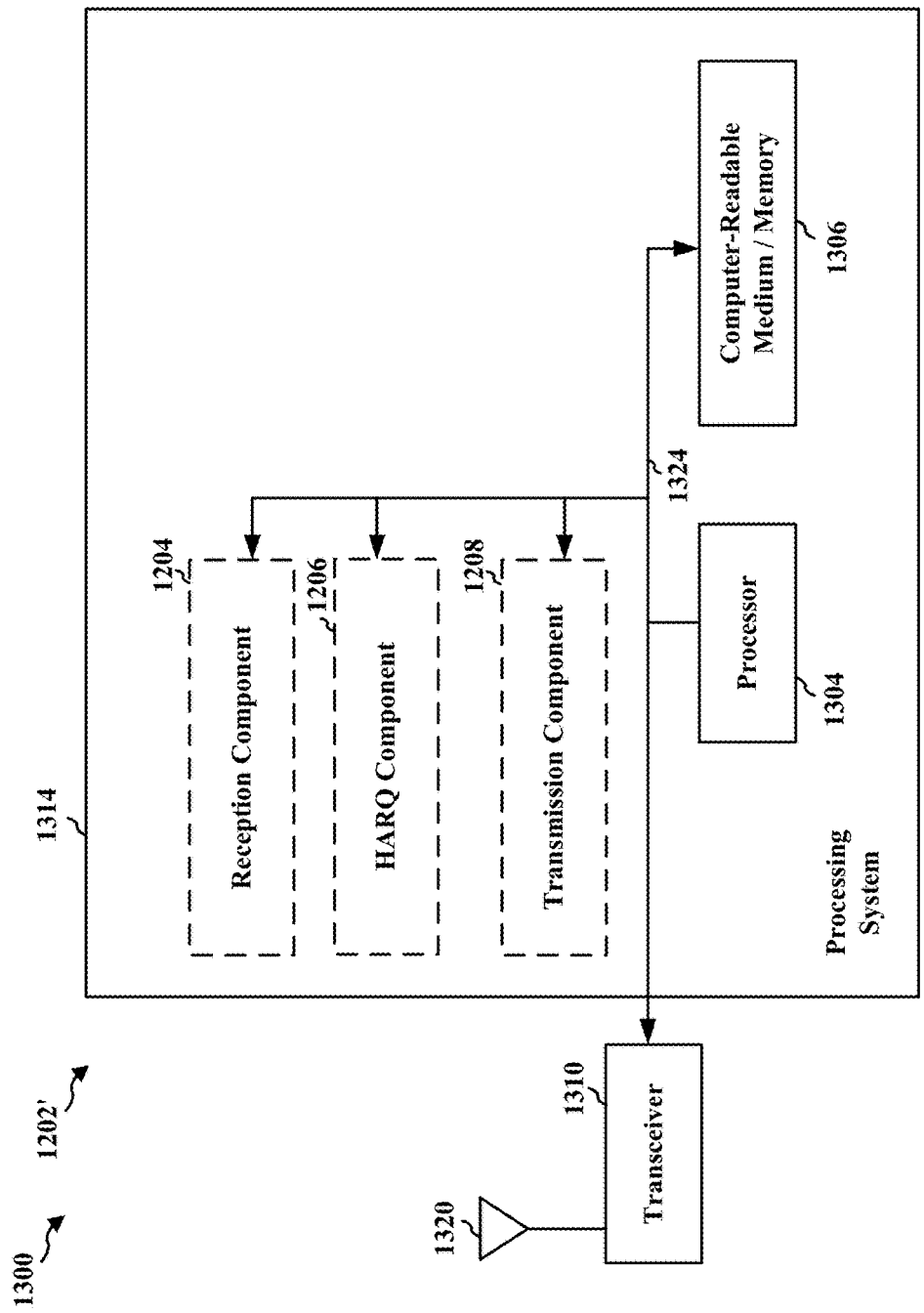
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1208, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication includes means for means for receiving first SC information associated with a first D2D communication from a second UE. In another configuration, the apparatus 1202/1202' for wireless communication includes means for receiving the first D2D communication from the second UE. In an aspect, the first D2D communication may include one or more first data. In a further configuration, the apparatus 1202/1202' for wireless communication includes means for performing a HARQ procedure for the first D2D communication. In yet another configuration, the apparatus 1202/1202' for wireless communication includes means for transmitting, to the second UE, HARQ feedback associated with the first D2D communication. In one aspect, the HARQ feedback may be transmitted in a predetermined subframe subsequent to a last subframe that includes a last data of the first D2D communication. In another aspect, the HARQ feedback may be mapped to a same resource in the predetermined subframe as a resource used for at least one of the first SC information or the one or more first data. In yet a further configuration, the apparatus 1202/1202' for wireless communication includes means for receiving second SC information associated with a second D2D communication from the second UE. In one aspect, the second SC information may be received before a last one of the one or more first data of the first D2D communication. In a further aspect, the second data of the second D2D communication may be interleaved with remaining first data of the first D2D communication. In still another configuration, the apparatus 1202/1202' for wireless communication includes means for receiving the second D2D communication from the second UE. In an aspect, the second D2D communication includes one or more second data. In another configuration, the apparatus 1202/1202' for wireless communication includes means for receiving, from a base station, resource location information associated with one or more resources used for transmitting the HARQ feedback. In a further configuration, the apparatus 1202/1202' for wireless communication includes means for communicating with the second UE to configure resource location information associated with one or more resources used for transmitting the HARQ feedback. In yet a further configuration, the apparatus 1202/1202' includes means for transmitting to the second UE a third D2D communication. In another aspect, the HARQ feedback is multiplexed with the third D2D communication. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication of a first user equipment (UE), comprising:
   transmitting first sidelink control (SC) information associated with a first device to device (D2D) communication to a second UE, the SC information indicating a number of hybrid automatic repeat request (HARQ) feedback processes to be performed for the first D2D communication;
   transmitting the first D2D communication to the second UE, the first D2D communication including one or more first data;
   prior to transmitting all of the data of the first D2D communication to the second UE, transmitting second SC information associated with a second D2D communication to the second UE;
   transmitting the second D2D communication to the second UE, the second D2D communication including one or more second data, wherein the one or more second data of the second D2D communication are multiplexed with remaining first data of the first D2D communication; and
   receiving, from the second UE, HARQ feedback associated with the first D2D communication based at least in part on the number of HARQ feedback processes indicated in the SC information.

2. The method of claim 1, wherein the HARQ feedback is received in a predetermined subframe subsequent to a last subframe that includes a last data of the first D2D communication.

3. The method of claim 2, wherein the predetermined subframe is reserved for the HARQ feedback.

4. The method of claim 2, wherein the HARQ feedback is mapped to a same resource in the predetermined subframe as a resource used for transmitting at least one of the first SC information or the one or more first data.

5. The method of claim 2, further comprising:
   receiving, from a base station, resource location information associated with one or more resources used for receiving the HARQ feedback.

6. The method of claim 2, further comprising:
communicating with the second UE to configure resource location information associated with one or more resources used for receiving the HARQ feedback.

7. The method of claim 1, further comprising:
multiplexing the one or more first data with additional control information,
wherein the first SC information includes an indicator that the one or more first data is multiplexed with the additional control information, and
wherein the additional control information includes at least one of a new data indicator (NDI) or a HARQ identification (HARQ ID).

8. The method of claim 1, wherein the number of HARQ feedback processes corresponds to a maximum quantity of medium access control (MAC) layer packet data units (PDUs) included in the first D2D communication.

9. A method of wireless communication of a first user equipment (UE), comprising:
receiving first sidelink control (SC) information associated with a first device to device (D2D) communication from a second UE, the SC information indicating a number of hybrid automatic repeat request (HARQ) feedback processes to be performed for the first D2D communication;
receiving the first D2D communication from the second UE, the first D2D communication including one or more first data;
prior to receiving all of the data of the first D2D communication, receiving second SC information associated with a second D2D communication from the second UE;
receiving the second D2D communication from the second UE, the second D2D communication including one or more second data, wherein the one or more second data of the second D2D communication are multiplexed with remaining first data of the first D2D communication;
performing the number of HARQ feedback processes for the first D2D communication indicated by the SC information; and
transmitting, to the second UE, HARQ feedback associated with the first D2D communication and the number of HARQ feedback processes.

10. The method of claim 9, wherein the HARQ feedback is transmitted in a predetermined subframe subsequent to a last subframe that includes a last data of the first D2D communication.

11. The method of claim 10, wherein the predetermined subframe is reserved for the HARQ feedback.

12. The method of claim 10, wherein the HARQ feedback is mapped to a same resource in the predetermined subframe as a resource used for at least one of the first SC information or the one or more first data.

13. The method of claim 10, further comprising:
receiving, from a base station, resource location information associated with one or more resources used for transmitting the HARQ feedback.

14. The method of claim 10, further comprising:
communicating with the second UE to configure resource location information associated with one or more resources used for transmitting the HARQ feedback.

15. The method of claim 9, further comprising:
transmitting to the second UE a third D2D communication,
wherein the HARQ feedback is multiplexed with the third D2D communication.

16. The method of claim 9, wherein the number of HARQ feedback processes corresponds to a maximum quantity of medium access control (MAC) layer packet data units (PDUs) included in the first D2D communication.

17. An apparatus for wireless communication, comprising:
a memory; and
at least one processor coupled to the memory and configured to:
transmit first sidelink control (SC) information associated with a first device to device (D2D) communication to a second UE, the SC information indicating a number of hybrid automatic repeat request (HARQ) feedback processes to be performed for the first D2D communication;
transmit the first D2D communication to the second UE, the first D2D communication including one or more first data;
prior to transmittal of all of the data of the first D2D communication to the second UE, transmit second SC information associated with a second D2D communication to the second UE;
transmit the second D2D communication to the second UE, the second D2D communication including one or more second data, wherein the one or more second data of the second D2D communication are multiplexed with remaining first data of the first D2D communication; and
receive, from the second UE, hybrid automatic repeat request (HARQ) HARQ feedback associated with the first D2D communication based at least in part on the number of HARQ feedback processes indicated in the SC information.

18. The apparatus of claim 17, wherein the HARQ feedback is received in a predetermined subframe subsequent to a last subframe that includes a last data of the first D2D communication.

19. The apparatus of claim 18, wherein the HARQ feedback is mapped to a same resource in the predetermined subframe as a resource used for transmitting at least one of the first SC information or the one or more first data.

20. The apparatus of claim 18, wherein the at least one processor is further configured to:
receive, from a base station, resource location information associated with one or more resources used for receiving the HARQ feedback.

21. The apparatus of claim 18, wherein the at least one processor is further configured to:
communicate with the second UE to configure resource location information associated with one or more resources used for receiving the HARQ feedback.

22. The apparatus of claim 17, wherein the at least one processor is further configured to:
multiplex the one or more first data with additional control information,
wherein the first SC information includes an indicator that the one or more first data is multiplexed with the additional control information, and
wherein the additional control information includes at least one of a new data indicator (NDI) or a HARQ identification (HARQ ID).

23. The apparatus of claim 17, wherein the number of HARQ feedback processes corresponds to a maximum quantity of medium access control (MAC) layer packet data units (PDUs) included in the first D2D communication.

24. An apparatus for wireless communication, comprising:

a memory; and at least one processor coupled to the memory and configured to:

receive first sidelink control (SC) information associated with a first device to device (D2D) communication from a second UE, the SC information indicating a number of hybrid automatic repeat request (HARQ) feedback processes to be performed for the first D2D communication;

receive the first D2D communication from the second UE, the first D2D communication including one or more first data;

prior to receiving all of the data of the first D2D communication from the second UE, receive second SC information associated with a second D2D communication from the second UE;

receive the second D2D communication from the second UE, the second D2D communication including one or more second data, wherein the one or more second data of the second D2D communication are multiplexed with remaining data of the first D2D communication;

perform the number of HARQ feedback processes for the first D2D communication indicated by the SC information; and transmit, to the second UE, HARQ feedback associated with the first D2D communication and the number of HARQ feedback processes.

25. The apparatus of claim 24, wherein the HARQ feedback is transmitted in a predetermined subframe subsequent to a last subframe that includes a last data of the first D2D communication.

26. The apparatus of claim 25, wherein the HARQ feedback is mapped to a same resource in the predetermined subframe as a resource used for at least one of the first SC information or the one or more first data.

27. The apparatus of claim 25, wherein the at least one processor is further configured to:

receive, from a base station, resource location information associated with one or more resources used for transmitting the HARQ feedback.

28. The apparatus of claim 25, wherein the at least one processor is further configured to:

communicate with the second UE to configure resource location information associated with one or more resources used for transmitting the HARQ feedback.

29. The apparatus of claim 24, wherein the at least one processor is further configured to:

transmit to the second UE a third D2D communication, wherein the HARQ feedback is multiplexed with the third D2D communication.

30. The apparatus of claim 24, wherein the number of HARQ feedback processes corresponds to a maximum quantity of medium access control (MAC) layer packet data units (PDUs) included in the first D2D communication.

* * * * *